(12) United States Patent
Sata et al.

(10) Patent No.: US 7,457,061 B2
(45) Date of Patent: Nov. 25, 2008

(54) LENS ACTUATOR

(75) Inventors: Norifumi Sata, Hyogo (JP); Shinsuke Kimoto, Osaka (JP); Takefumi Inoue, Nara (JP); Masaya Watada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/808,809

(22) Filed: Jun. 13, 2007

(65) Prior Publication Data

US 2008/0025164 A1    Jan. 31, 2008

(30) Foreign Application Priority Data

Jul. 26, 2006  (JP) ............... 2006-202772

(51) Int. Cl.
  *G02B 7/02* (2006.01)
  *G11B 7/00* (2006.01)
(52) U.S. Cl. .................. 359/824; 359/813; 359/814; 359/823; 369/44.14; 369/44.15; 369/44.16; 369/44.21; 369/112.24; 310/12
(58) Field of Classification Search .......... 359/811, 359/813, 814, 823, 824, 819; 369/44.14–44.16, 369/44.21, 44.23, 112.23, 112.24; 310/12, 310/14, 23; 318/114; 396/144; 340/384.1
See application file for complete search history.

(56) References Cited

U.S. PATENT DOCUMENTS

| 4,660,190 A | 4/1987 | Fujii et al. |
| 4,764,911 A | 8/1988 | Morota et al. |
| 6,307,687 B1 * | 10/2001 | Nishikawa .................. 359/814 |
| 6,370,093 B1 * | 4/2002 | Tada et al. ............... 369/44.25 |
| 7,227,285 B2 * | 6/2007 | Osaka ......................... 310/15 |
| 7,271,511 B2 * | 9/2007 | Osaka ......................... 310/12 |
| 7,285,879 B2 * | 10/2007 | Osaka ......................... 310/12 |
| 7,291,942 B2 * | 11/2007 | Osaka ......................... 310/12 |
| 7,298,562 B2 * | 11/2007 | Sue et al. ..................... 359/819 |
| 2004/0130808 A1 | 7/2004 | Yoneyama et al. |

FOREIGN PATENT DOCUMENTS

| GB | 2 205 003 A | 11/1988 |
| JP | 05-189781 | 7/1993 |
| JP | 2004-280031 | 10/2004 |

OTHER PUBLICATIONS

European Search Report issued in corresponding European Patent Application No. EP 07112532.2-2217, mailed on Dec. 24, 2007.

* cited by examiner

*Primary Examiner*—Loha Ben
(74) *Attorney, Agent, or Firm*—McDermott Will & Emery LLP

(57) ABSTRACT

A lens actuator includes a carrier having a tubular shape having a through-hole provided therein. The through-hole is arranged to mount a lens therein. The lens actuator further includes plural springs contacting upper and lower surfaces of the carrier, a coil fixed to the carrier, a first yoke, a second yoke, and a magnet contacting the first yoke and the second yoke. The coil is placed between the first yoke and the second yoke. This lens actuator moves the lens by a long distance, and has a small size.

2 Claims, 8 Drawing Sheets

LENS ACTUATOR

FIELD OF THE INVENTION

The present invention relates to a lens actuator mainly used in optical equipment, such as a camera or a mobile phone, for moving a lens.

BACKGROUND OF THE INVENTION

Cameras and mobile phones have recently included lens actuators in order to provide for automatic focusing functions. Such lens actuator have been accordingly demanded to be small in size and be able to move lenses by long distances.

FIG. 6 is a sectional view of a conventional lens actuator 501 disclosed in Japanese Patent Lain-Open Publication No. 2004-280031. FIG. 7 is an exploded perspective view of the lens actuator 501. Carrier 1 made of insulating resin has a cylindrical shape having a though-hole arranged to mount a lens into the through-hole. Carrier 1 is accommodated between case 3 and cover 2 placed over a top surface of case 3 so as to be movable in vertical directions. Cover 2 and case 3 are made of insulating resin, similarly carrier 1.

Upper spring 4 and lower spring 5 are made of thin metal plates. Upper spring 4 is placed between a bottom surface of cover 2 and a top surface of carrier 1 while being slightly compressed. Lower spring 5 is placed between a bottom surface of carrier 1 and an inner bottom surface of case 3 while being slightly compressed. Upper spring 4 and lower spring 5 hold carrier 1 at a predetermined position.

Coil 6 is made a copper alloy wire wound annularly. Yoke 7 made of magnetic material, such as iron, has a substantially cylindrical shape and has a section of substantially U-shape. Coil 6 is fixed onto flange 1A provided under an outer circumferential surface of carrier 1. Yoke 7 covers coil 6, and faces the outer circumferential surface of carrier 1.

FIG. 8 is a partially-enlarged view of lens actuator 501. Plural magnets 8 having a substantially arcuate shape are attached onto an inside of outer wall 7C of yoke 7. Gap L501 inside magnets 8, inner wall 7A of yoke 7, top section 7B of yoke 7, and outer wall 7C of yoke 7 provide a magnetic path along which a magnetic flux produced from magnets 8 passes. Coil 6 is placed in gap L501 between the inner circumferential surface of magnets 8 and inner wall 7A.

Both ends of coil 6 made of conductive material, such as copper, are connected to plural electrodes 9 by soldering, respectively. Respective lower ends of electrodes 9 protrude outward from a bottom of case 3. Spacer 10 made of insulating resin is placed on lower spring 5, thus providing lens actuator 501.

Lens actuator 501 is mounted to a device, such as a camera or a mobile phone. Electrodes 9 are connected to an electronic circuit of the device.

An operation of lens actuator 501 will be described below. When a user activates a push button of the device including lens actuator 501, the electronic circuit of the device applies a voltage to electrodes 9 to cause a current to flow in coil 6, accordingly producing a magnetic field, as shown in FIG. 8. Magnetic field M501 directed from magnet 8 to inner wall 7A of yoke 7 is produced around coil 6, and applies a force in a vertical direction, such as upward direction of 501A or downward direction 501B, to coil 6. This force causes coil 6 and carrier 1 having coil 6 mounted thereto to move in the upward direction 501A or downward direction 501B, thereby adjusting the focus of the lens mounted into carrier 1.

Upon the current flowing in coil 6 being released, respective elastic forces of upper spring 4 and lower spring 5 push carrier 1 to hold carrier 1 at the predetermined position.

In lens actuator 501, as shown in FIG. 8, a magnet field is produced in a horizontal direction around coil 6 at the predetermined position, and a large magnetic field is produced at the center surrounded by magnets 8 facing coil 6. The magnetic field produced by magnets 8 is directed toward top section 7B in gap L501 between coil 6 and top section 7B of yoke 7. Therefore, a magnetic field in gap L501 is smaller than a magnetic field in gap L502. Accordingly, coil 6 which has moved in direction 501A receives a small force from the magnetic field. In order to increase a moving distance of coil 6, i.e., carrier 1, it is necessary to increase the height of magnet 8, accordingly increasing the size of lens actuator 501.

SUMMARY OF THE INVENTION

A lens actuator includes a carrier having a tubular shape having a through-hole. The through-hole is arranged to mount a lens therein. The lens actuator further includes plural springs contacting upper and lower surfaces of the carrier, a coil fixed to the carrier, a first yoke, a second yoke, and a magnet contacting the first yoke and the second yoke. The coil is placed between the first yoke and the second yoke.

This lens actuator moves the lens by a long distance, and has a small size.

DETAILED DESCRIPTION OF THE PREFERRED EMBODIMENT

Figure 1:
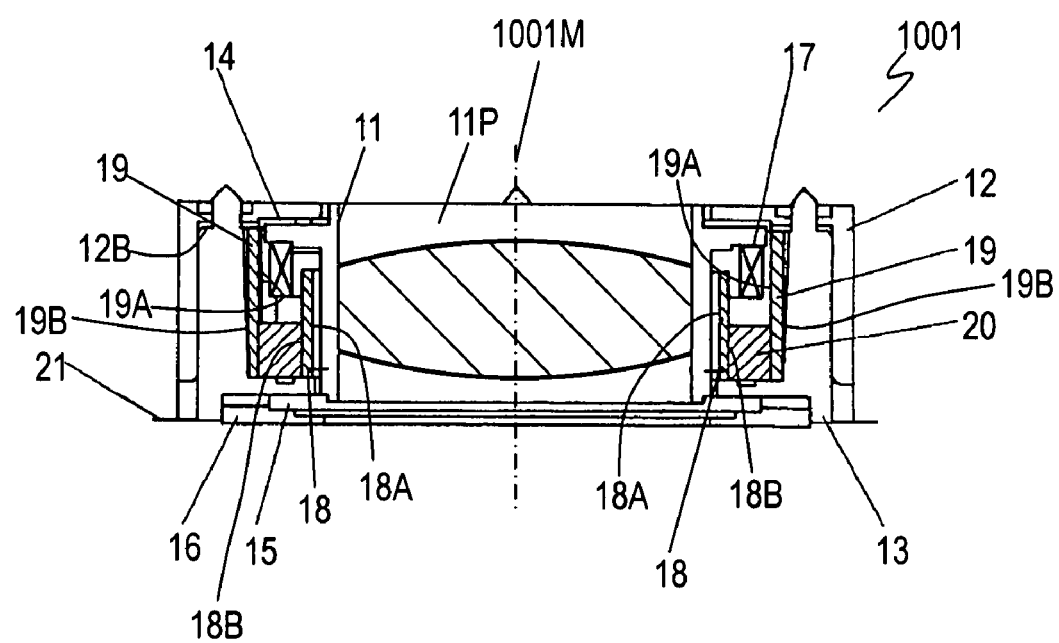
FIG. 1 is a sectional view of a lens actuator according to an exemplary embodiment of the present invention.
Figure 2:
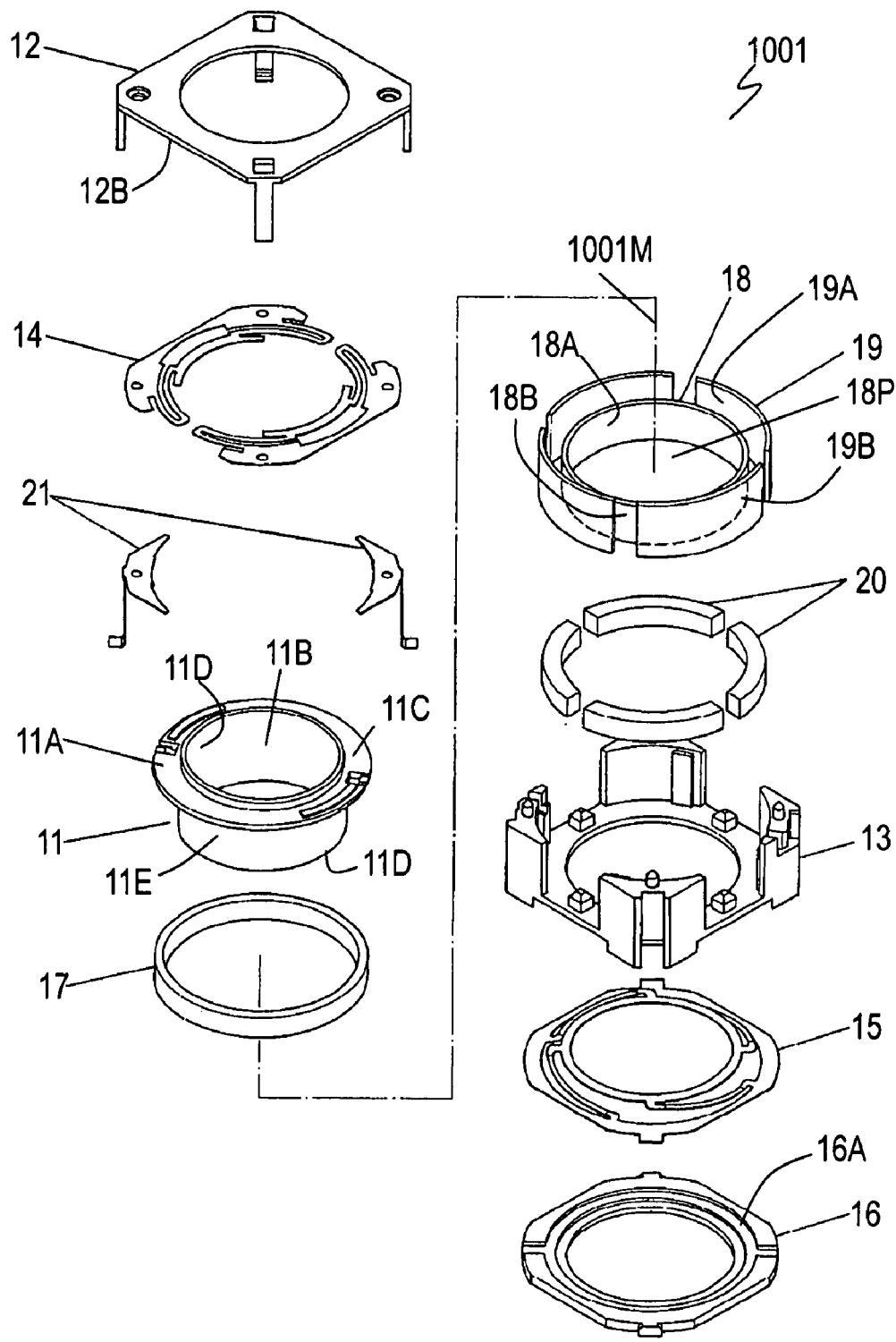
FIG. 2 is an exploded perspective view of the lens actuator according to the embodiment.

FIGS. 1 and 2 are a sectional view and an exploded perspective view of lens actuator 1001 according to an exemplary embodiment of the present invention, respectively. Carrier 11 has substantially cylindrical shape, a tubular shape, having a through-hole 11B arranged to have a lens accommodated therein. Cover 12 covers a top surface of case 13. Carrier 11 is accommodated between case 13 and cover 12 placed over the top surface of case 3, and is movable in vertical directions. Carrier 11, cover 12, and case 13 are made of insulating resin, such as polycarbonate containing glass. Carrier 11 has flange 11A protruding from an outer circumferential surface of carrier 11.

Coil 17 includes a copper-alloy wire coated with insulating resin and wound annularly. Inner yoke 18 made of magnetic material, such as iron, has a substantially cylindrical shape having through-hole 18P therein. Plural outer yokes 19 made of magnetic material, such as iron, have a substantially arcuate shape. Coil 17 is fixed to flange 11A of carrier 11. Inner yoke 18 is surrounded by outer yokes 19. Carrier 11 is accommodated in through-hole 18P of inner yoke 18 such that carrier 11 is movable along center axis 1001M of the cylindrical shape of inner yoke 18. Outer circumferential surface 11E of carrier 11 faces inner circumferential surface 18A of inner yoke 18. Outer circumferential surface 18B of inner yoke 18 faces inner circumferential surfaces 19A of outer yokes 19. Outer yoke 19 has outer circumferential surface 19B opposite to inner circumferential surface 19A. Coil 17 is placed between inner yoke 18 and outer yokes 19 such that coil 17 is movable in a direction parallel to center axis 1001M.

Upper spring 14 and lower spring 15 are made of thin metal plate, such as, but not limited to, a steel plate and copper alloy plate. Carrier 11 has top end 11C and bottom end 11D in a direction of center axis 101M. Upper spring 14 is placed between bottom surface 12B of cover 12 and top surface 11C of carrier 11 (flange 11A) while being slightly compressed. Lower spring 15 is placed bottom surface 11D of carrier 11 and top surface 16A of lower cover 16 under case 13 while being slightly compressed. An elastic force produced by upper spring 14 and lower spring 15 which are slightly compressed urges carrier 11 from top surface 11C and bottom surface 11D, accordingly holding carrier 11 at a predetermined position along center axis 1001M.

Figure 3:
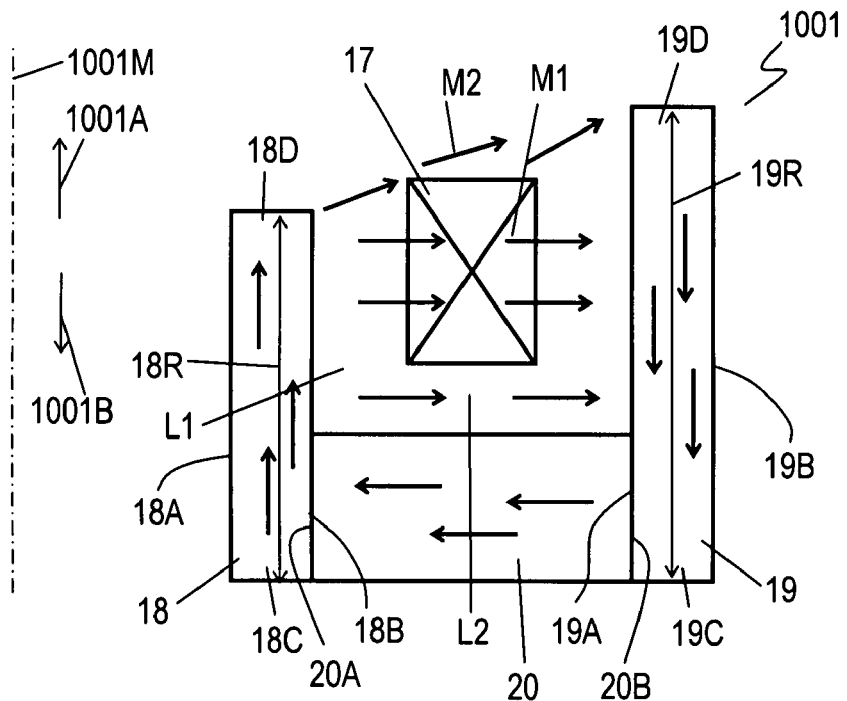
FIG. 3 is a partially-enlarged view of the lens actuator according to the embodiment.

FIG. 3 is a partially-enlarged view of lens actuator 1001. Plural magnets 20 made of neodymium-base permanent magnet have substantially arcuate shapes having inner circumferential surfaces 20A and outer circumferential surfaces 20B. Inner circumferential surfaces 20A of the magnets are attached onto outer circumferential surface 18B of inner yoke 18 while contacting end 18C of inner yoke 18. Outer circumferential surfaces 20B of the magnets are attached onto inner circumferential surfaces 19A of outer yokes 19 while contacting ends 19C of outer yokes 19 facing end 18C of inner yoke 18. Coil 17 and magnets 20 are placed between inner yoke 18 and outer yokes 19. Coil 17 is located in gap L1 surrounded by magnets 20, outer circumferential surface 18B of inner yoke 18, and inner circumferential surfaces 19A of outer yokes 19. Magnetic field M1 produced by magnets 20 passes through inner yoke 18, gap L1, and outer yokes 19. Thus, inner yoke 18 and outer yokes 19 provide a magnetic path along which magnetic field M1 crossing coil 17 passes. No portion of magnets 20 are positioned between coil 17 and inner yoke 18. No portion of magnets 20 are positioned between coil 17 and outer yokes 19. Coil 17 and magnets 20 are arranged in parallel to center axis 1001M.

Both ends of the wire of coil 17 are connected to electrodes 21 by soldering, respectively. Electrodes 21 are made of conductive material, such as, but not limited to, copper alloy. Respective lower ends of electrodes 21 protrude outward from a bottom of case 13, thus providing lens actuator 1001.

Lens actuator 1001 is mounted to a device, such as a camera and a mobile phone. Electrodes 21 are connected to an electronic circuit of the device.

An operation of lens actuator 1001 will be described below. When a user activates a push button of the device including lens actuator 1001, the electronic circuit of the device applies a voltage to electrodes 21, thereby causing a current to flow in coil 17. Coil 17 which magnetic field M1 crosses, as shown in FIG. 3, receives a force in upward direction 1001A and downward direction 1001B which are parallel to center axis 100M and perpendicular to magnetic field M1. This force causes coil 17 and carrier 11 having coil 17 mounted thereto to move in directions 1001A and 1001B from the predetermined position so as to adjust the focus of the lens fixed to carrier 11, thus performing automatic focusing.

Upon the current flowing in coil 17 being released, respective elastic forces produced by upper spring 14 and lower spring 15 move carrier 11 back to the predetermined position.

As shown in FIG. 3, magnetic field M1 is produced around coil 17. Magnetic field M1 is uniformly strong along the entire height of coil 17 and in gap L1 and gap L2 between coil 17 and magnets 20, accordingly causing coil 17 to move reliably in directions 1001A and 1001B with a large force.

Coil 17 and magnets 20 are arranged vertically between inner yoke 18 and outer yokes 19. This arrangement reduces the distance between inner yoke 18 and outer yokes 19, accordingly allowing lens actuator 1001 to have a small diameter.

Figure 4:
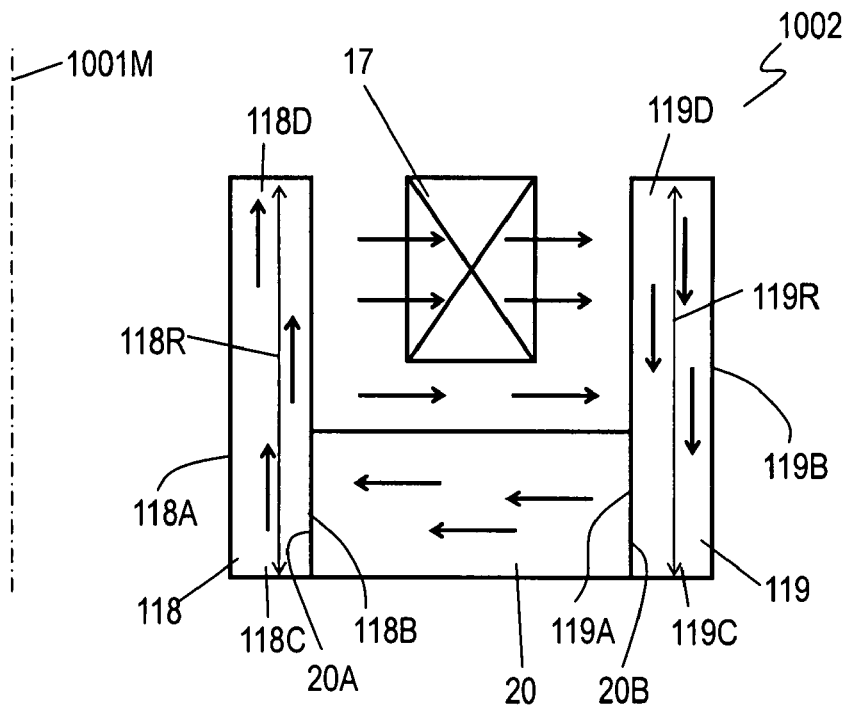
FIG. 4 is a partially-enlarged view of another lens actuator according to the embodiment.

FIG. 4 is a partially-enlarged view of another lens actuator 1002 according to the embodiment. In FIG. 4, the same components as those of lens actuator 1001 shown in FIGS. 1 to 3 are denoted by the same reference numerals, and their description will be omitted. Lens actuator 1002 includes inner yoke 118 and outer yokes 119 instead of inner yoke 18 and outer yokes 19 of lens actuator 1001 shown in FIG. 3. No portion of magnets 20 are positioned between coil 17 and inner yoke 118. No portion of magnets 20 are positioned between coil 17 and outer yokes 119. In lens actuator 1001 shown in FIG. 3, height 18R of inner yoke 18 in the direction of center axis 1001M of inner yoke 18 is smaller than height 19R of outer yokes 19 in the direction. This structure produces magnetic field M2 in a slanting direction from end 18D of inner yoke 18 opposite to end 18C toward end 19C of outer yokes 19. In lens actuator 1002, height 118R of inner yoke 118 in the direction of center axis 1001M is equal to height 119R of outer yokes 119 in the direction. This structure does not produce magnetic field M2 in the slanting direction shown in FIG. 3. Therefore, a large magnetic field is produced between inner yoke 118 and outer yokes 119, accordingly causing coil 17 and carrier 11 to move with a large force.

Figure 5A:
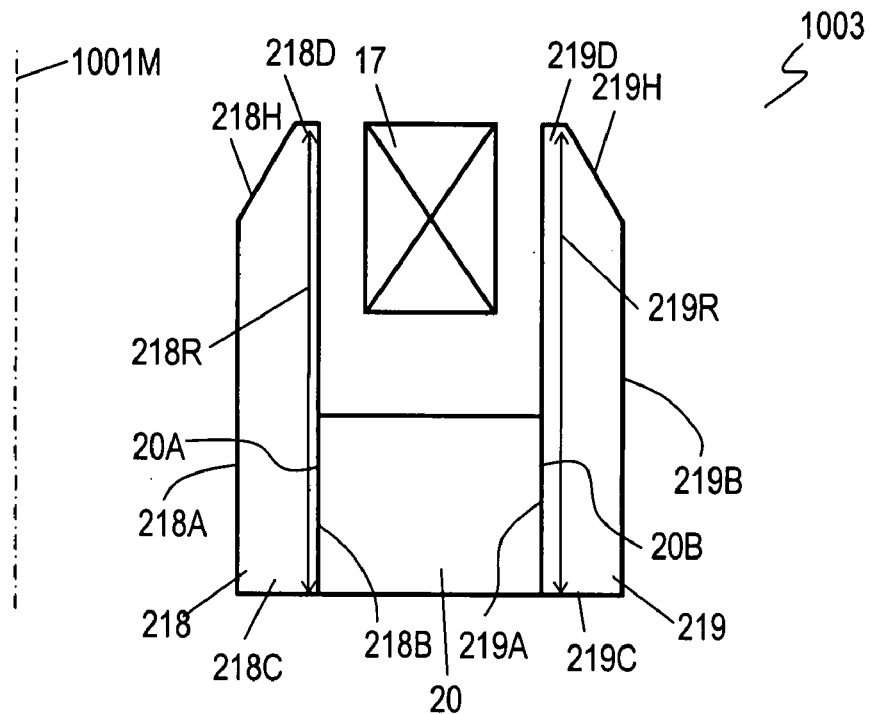
FIGS. 5A to 5D are partially-enlarged views of still another lens actuators according to the embodiment.

FIG. 5A is a partially-enlarged view of still another lens actuator 1003 according to the embodiment. In FIG. 5A, the same components as those of lens actuator 1001 shown in FIGS. 1 to 3 are denoted by the same reference numerals, and their description will be omitted. Lens actuator 1003 includes inner yoke 218 and outer yokes 219 instead of inner yoke 118 and outer yokes 119 of lens actuator 1001 shown in FIG. 3. No portion of magnets 20 are positioned between coil 17 and inner yoke 218. No portion of magnets 20 are positioned between coil 17 and outer yokes 219. Inner yoke 218 has inner circumferential surface 218A and outer circumferential surface 218B opposite to inner circumferential surface 218A. Each of outer yokes 219 has inner circumferential surface 219A and outer circumferential surface 219B opposite to inner circumferential surface 219A. Inner circumferential surfaces 20A of magnets 20 are attached onto outer circumferential surface 218B of inner yoke 218 while contacting ends 218C of inner yoke 218. Outer circumferential surfaces 20B of the magnets are attached onto inner circumferential surfaces 219A of outer yokes 219 while contacting ends 219C of outer yokes 219 facing end 218C of inner yoke 218. Height 218R of inner yoke 218 in the direction parallel to center axis 1001M is equal to height 219R of outer yokes 219 in this direction. A portion of inner circumferential surface 218A contacting end 218D of inner yoke 218 opposite to end 218C of inner yoke 218 is chamfered, thus having slant portion 218H. A portion of outer circumferential surface 219B contacting end 209D of outer yoke 219 opposite to end 219C of outer yoke 219 is chamfered, thus having slant portion 219H. Slant portions 218H and 219H reduce leakage of the magnetic flux between ends 218D and 219D.

Figure 5B:
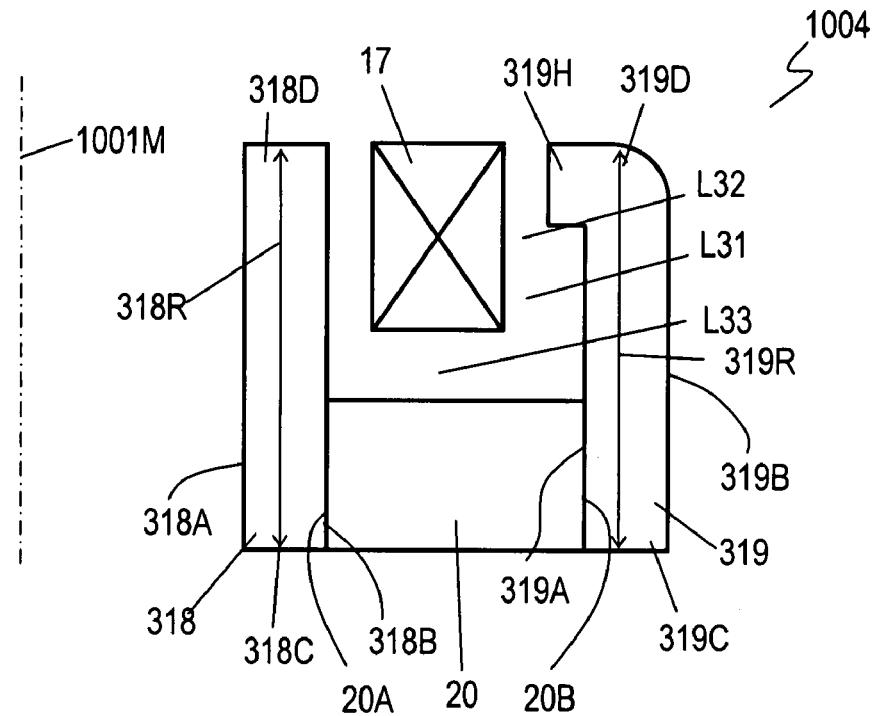

FIG. 5B is a partially-enlarged view of still another lens actuator 1004 according to the embodiment. In FIG. 5B, the same components as those of lens actuator shown in FIGS. 1 to 3 are denoted by the same reference numerals, and their description will be omitted. Lens actuator 1004 includes inner yoke 318 and outer yokes 319 instead of inner yoke 18 and outer yokes 19 of lens actuator 1001 shown in FIG. 3. No portion of magnets 20 are positioned between coil 17 and inner yoke 318. No portion of magnets 20 are positioned between coil 17 and outer yokes 319. Inner yoke 318 has inner circumferential surface 318A and outer circumferential surface 318B opposite to inner circumferential surface 318A. Outer yokes 319 have inner circumferential surfaces 319A and outer circumferential surfaces 319B opposite to inner circumferential surfaces 319A. Inner circumferential surfaces 20A of magnets 20 are attached onto outer circumferential surface 318B of inner yoke 318 while contacting end 318C of inner yoke 318. Outer circumferential surfaces 20B of magnets 20 are attached onto inner circumferential surfaces 319A of outer yokes 319 while contacting ends 319C of outer yokes 319 facing end 318 of inner yoke 318. Height 318R of inner yoke 318 in the direction parallel to center axis 1001M is equal to height 319R of outer yokes 319 in this direction. Outer yoke 319 has end 319D opposite to end 319C of outer yoke 319. Inner yoke 318 has end 318D opposite to end 318C of inner yoke 318. Outer yoke 319 has bend portion 319H protruding from end 319D of outer yoke 319 toward end 318D of inner yoke 318 opposite to end 318C of inner yoke 318. Bend portion 319H partially covers an opening between end 318D of inner yoke 318 and end 319D of outer yokes 319. The structure reduces the difference between respective intensities of a magnetic field in gap L32 close to end 318D and end 319D and a magnetic field in gap L33 close to magnets 20 within gap L31 between inner yoke 318 and outer yoke 319, thus producing a substantially uniform magnetic field in gap L31.

Figure 5C:
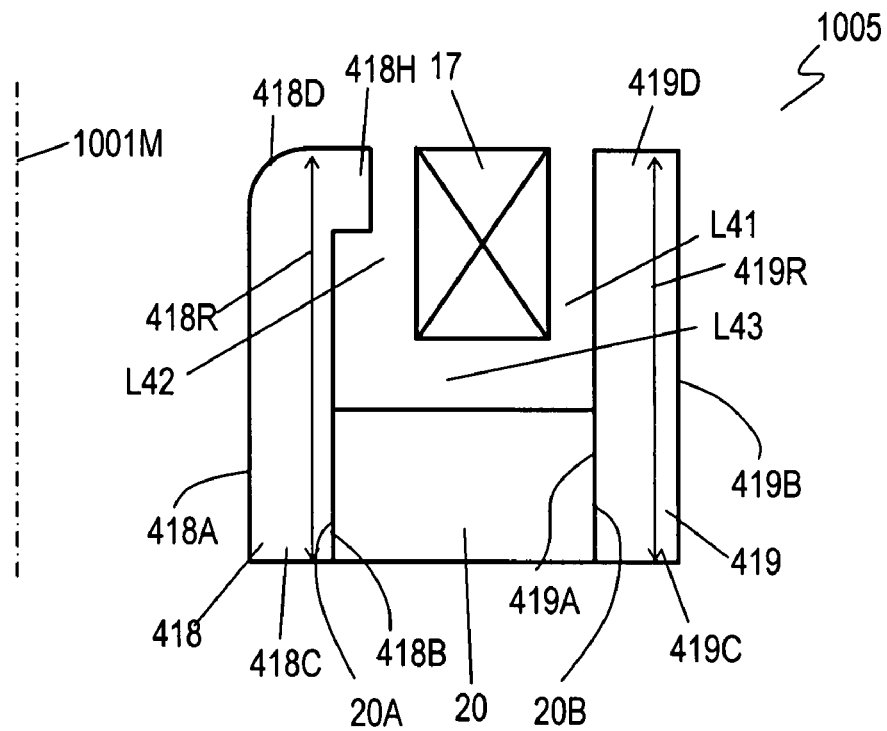

FIG. 5C is a partially-enlarged view of still another lens actuator 1005 according to the embodiment. In FIG. 5C, the same components as those of lens actuator 1001 shown in FIGS. 1 to 3 are denoted by the same reference numerals, and their description will be omitted. Lens actuator 1005 includes inner yoke 418 and outer yokes 419 instead of inner yoke 18 and outer yokes 19 of lens actuator 1001 shown in FIG. 3. No portion of magnets 20 are positioned between coil 17 and inner yoke 418. No portion of magnets 20 are positioned between coil 17 and outer yokes 419. Inner yoke 418 has inner circumferential surface 418A and outer circumferential surface 418B opposite to inner circumferential surface 418A. Outer yoke 419 has inner circumferential surface 419A and outer circumferential surface 419B opposite to inner circumferential surface 419A. Inner circumferential surfaces 20A of magnets 20 are attached onto outer circumferential surface 418B of inner yoke 418 while contacting end 418C of inner toke 418. Outer circumferential surfaces 20B of magnets 20 are attached onto inner circumferential surfaces 419A of outer yokes 419 while contacting ends 419C of outer yokes 419 facing end 418C of inner yoke 418. Height 418R of inner yoke 418 in the direction parallel to center axis 1001M is equal to height 419R of outer yokes 419 in this direction. Inner yoke 418 has end 418D opposite to end 418C of inner yoke 418. Outer yoke 419 has end 419D opposite to end 419C of outer yoke 419. Inner yoke 418 has bend portion 418H protruding from end 418D of inner yoke 418 toward ends 419D of outer yokes 419. Bend portion 418H partially covers an opening between end 418D of inner yoke 418 and end 419D of outer yokes 419. The structure reduces the difference between respective intensities of a magnetic field in gap L42 close to end 418D and end 419D and magnetic field in gap L43 close to magnets 20 within gap L41 between inner yoke 418 and outer yoke 419, thus producing a substantially uniform magnetic field in gap L41.

Figure 5D:
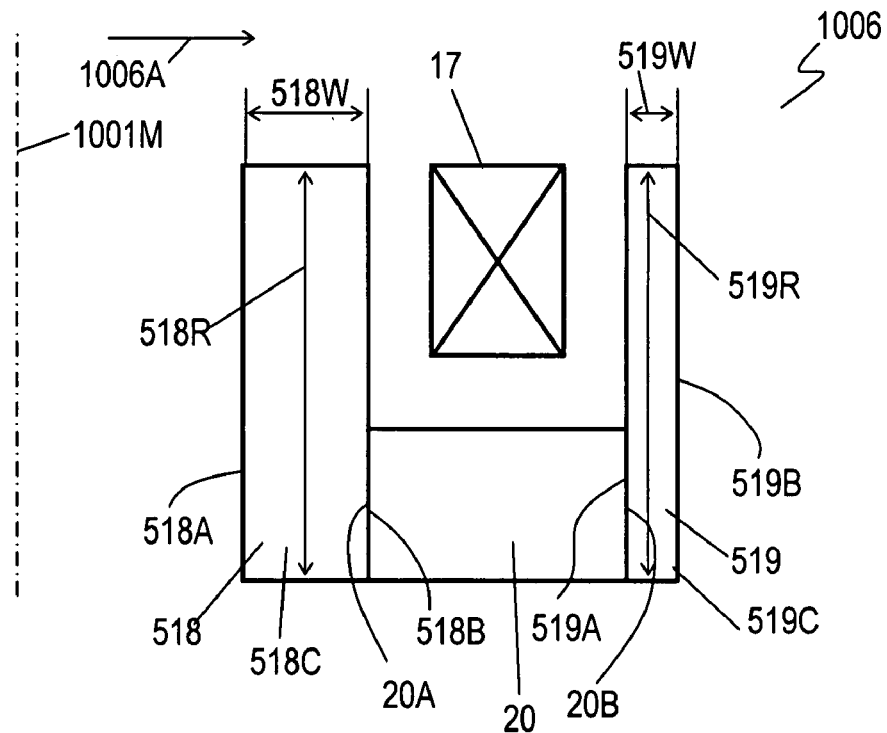
Figure 6:
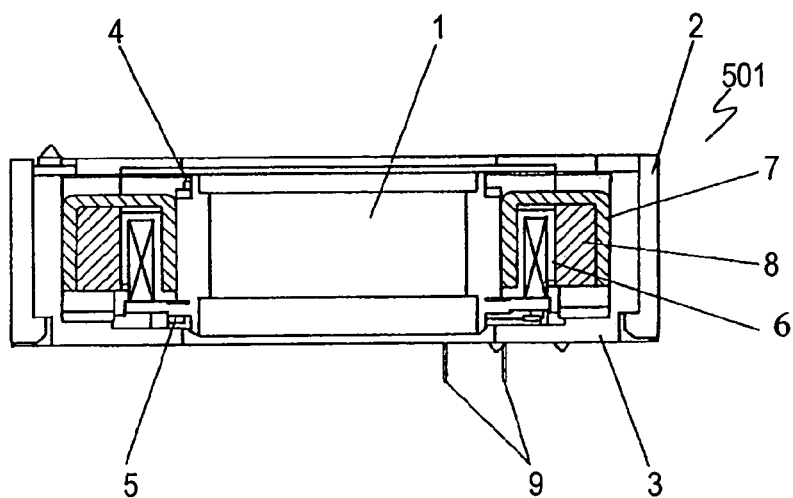
FIG. 6 is a sectional view of a conventional lens actuator.
Figure 7:
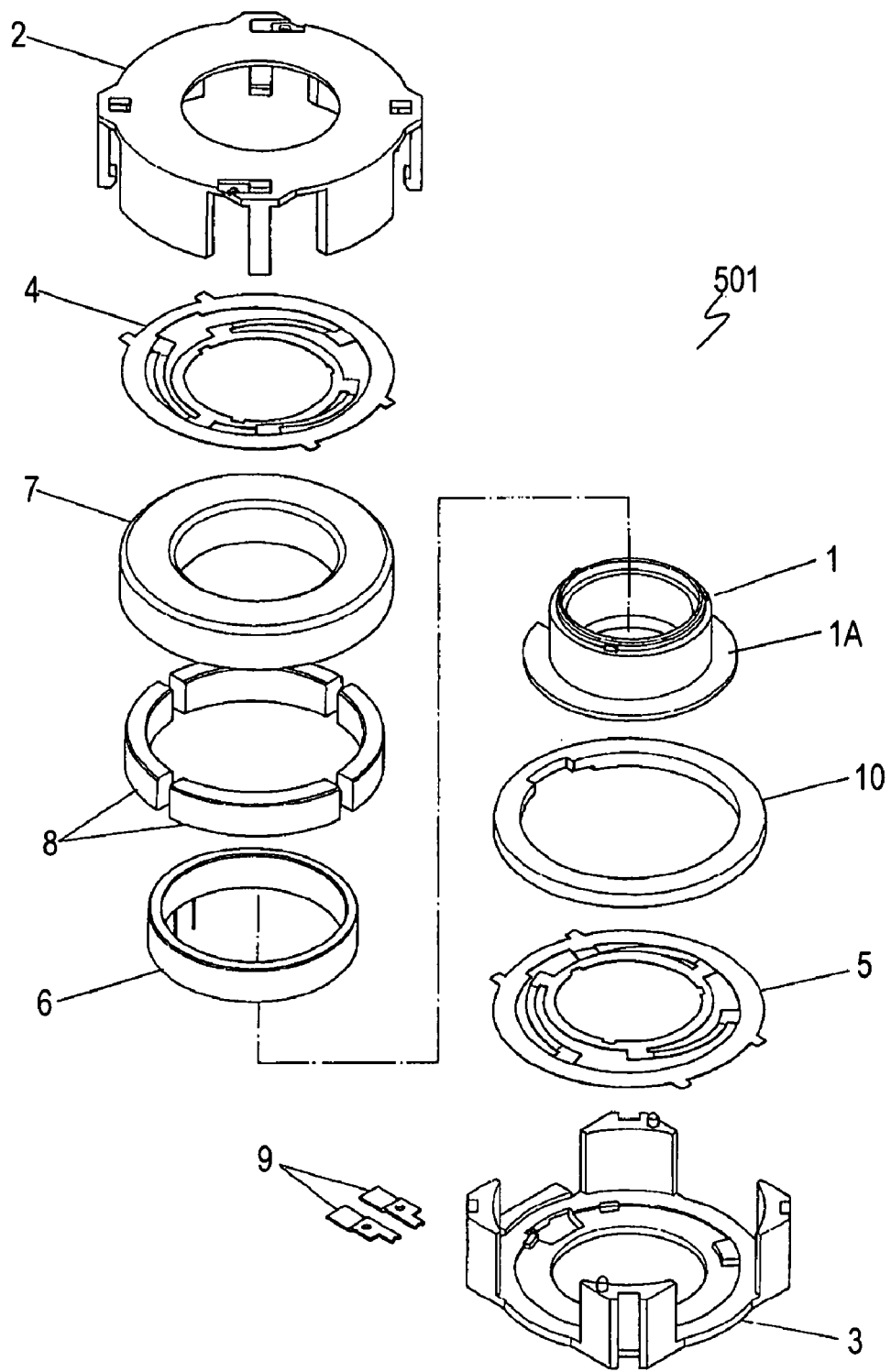
FIG. 7 is an exploded perspective view of the conventional lens actuator.
Figure 8:
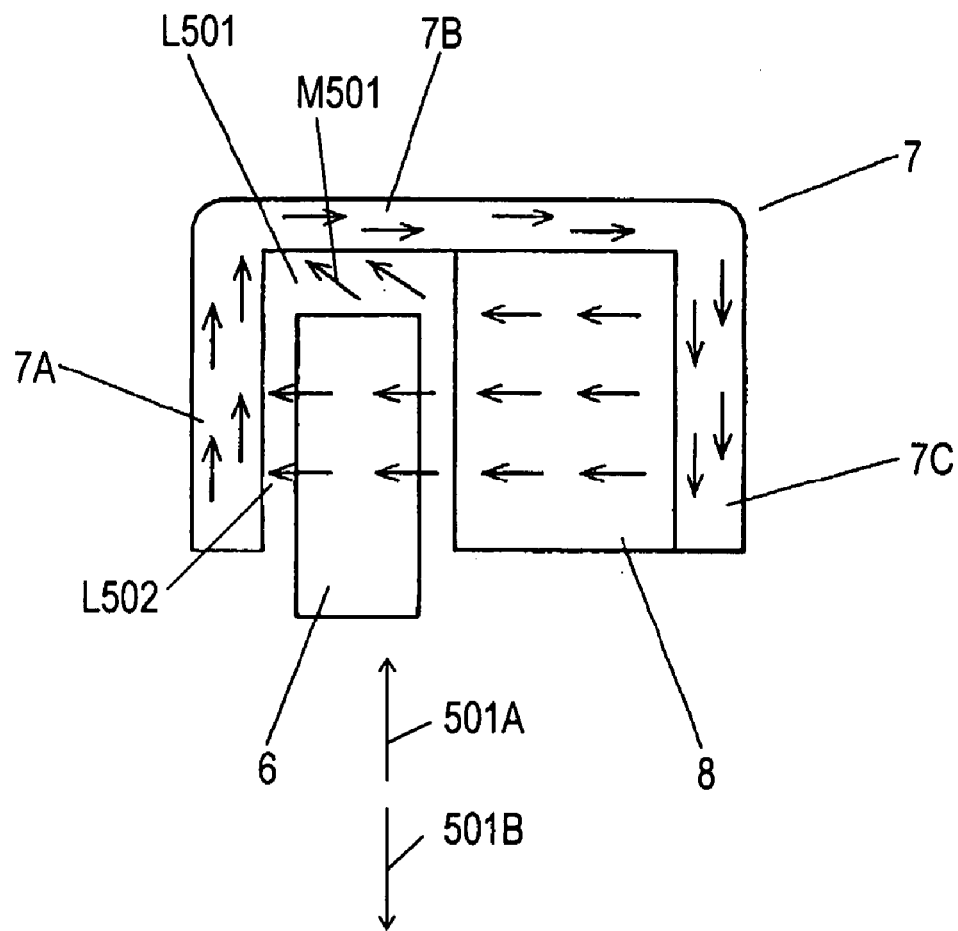
FIG. 8 is a partially-enlarged view of the conventional lens actuator.

FIG. 5D is a partially-enlarged view of still another lens actuator 1006 according to the embodiment. In FIG. 5D, the same components as those of lens actuator 1001 shown in FIGS. 1 to 3 are denoted by the same reference numerals, and their description will be omitted. Lens actuator 1006 includes inner yoke 518 and outer yokes 519 instead of inner yoke 18 and outer yokes 19 of lens actuator 1001 shown in FIG. 3. No portion of magnets 20 are positioned between coil 17 and inner yoke 518. No portion of magnets 20 are positioned between coil 17 and outer yokes 519. Inner yoke 518 has inner circumferential surface 518A and outer circumferential surface 518B opposite to inner circumferential surface 518A. Outer yoke 519 has inner circumferential surface 519A and outer circumferential surface 519B opposite to inner circumferential surface 519A. Inner circumferential surfaces 20A of magnets 20 are attached onto outer circumferential surface 518B of inner yoke 518 while contacting end 518C of inner yoke 518. Outer circumferential surfaces 20B of magnets 20 are attached onto inner circumferential surfaces 519A of outer yokes 519 while contacting ends 519C of outer yokes facing end 518C of inner yoke 518. Height 518R of inner yoke 518 in the direction parallel to center axis 1001M is equal to height 519R of outer yokes 519 in this direction. Inner yoke 518 and outer yokes 519 have width 518W and 519W, respectively, in radial direction 1006 perpendicular to center axis 1001M. Widths 518W and 519W are determined so that the total volume of outer yokes 519 becomes equal to the volume of inner yoke 518. According to their diameters, in general, width 518W is determined to be larger than width 519W. The structure produces a uniform magnetic field.

The present invention as been described with reference to the foregoing embodiments. It is noted that the present invention may be embodied in other forms without departing from the spirit of the invention. The present embodiments are therefore to be considered in all respects as illustrative and not restrictive, the scope of the invention being indicated by the appended claims.

What is claimed is:

1. A lens actuator comprising:
   a carrier having a tubular shape having a through-hole provided therein, the through-hole being arranged to mount a lens therein;
   a plurality of springs contacting both ends of the carrier, respectively;
   a coil fixed to the carrier;
   a first yoke having a first surface facing the coil;
   a second yoke having a second surface facing the coil, the coil being placed between the first surface of the first yoke and the second surface of the second yoke; and
   a magnet contacting the first surface of the first yoke and the second surface of the second yoke.

2. The lens actuator of claim 1, wherein a height of the first yoke is equal to a height of the second yoke.

* * * * *